United States Patent Office 3,527,856
Patented Sept. 8, 1970

3,527,856
EXPANSION OF COMPRESSED VERMICULAR GRAPHITE SCRAP
Franciszek Olstowski, Freeport, Tex., assignor to The Dow Chemical Company, Midland, Mich., a corporation of Delaware
No Drawing. Continuation-in-part of application Ser. No. 539,731, Apr. 4, 1966. This application Nov. 6, 1968, Ser. No. 773,965
Int. Cl. B29j 1/00
U.S. Cl. 264—109     8 Claims

ABSTRACT OF THE DISCLOSURE

A process for recovering compressed vermicular graphite scrap by reducing the size of the scrap to particles having a size between 100 mesh and particles having about 1 inch as their longest dimension, treating such particles with an expanding agent and rapidly heating the treated particles to a temperature of above 200° C. to produce a low density, vermicular form of graphite. As expanding agents, liquid organic materials, water, and aqueous solutions of water-soluble inorganic acids, inorganic bases, inorganic salts and water-soluble organic materials containing at least 50% water are employed.

---

This application is a continuation-in-part of application Ser. No. 539,731, filed Apr. 4, 1966, now abandoned.

This invention relates to a process for recovering and utilizing compressed vermicular graphite scrap.

In the production, shaping and use of films, foils, blocks and other shaped structures produced by compressing vermicular graphite, a quantity of scrap is normally produced which, in scrap form, has little value or utility.

It is an object of this invention, therefore, to provide a method for the recovery of compressed vermicular graphite scrap. It is a further object to provide a method for the conversion of compressed vermicular graphite into a useful and valuable form. These and other objects and advantages will become obvious from a reading of the following detailed description.

It has been discovered that compressed vermicular graphite scrap may be recovered in a valuable and useful form by mechanically reducing the particle size of the scrap so that most of the particles are between 100 mesh (Standard Sieve Size) and particles being 1 inch in the largest dimension. A particle size of from about 5 to about 12 mesh is particularly desirable. Such particles are then treated with an expanding agent and heated rapidly to produce expansion to the low bulk density vermicular form. This vermicular graphite product may be compressed into integral monolithic structures having properties approaching those of structures produced from vermicular graphite derived directly from natural flake graphite.

Standard mechanical means are employed for reducing the scrap to the desired particle size. Shredding, chopping, cutting, and attrition are all suitable. Usually, such size reduction of the scrap particles is accomplished prior to treatment with the expanding agent but this is not essential. Similar results are obtained by partially reducing the particle size, e.g. to an inch or less, treating with an expanding agent and further reducing the particle size prior to the heat-induced expansion. Likewise, the scrap material may be mechanically reduced in size while in the presence of the expanding agent. Both size reduction and treatment with expansion agents must be accomplished prior to heating, however, in order to reduce a satisfactory vermicular product. Additionally, any of the steps of mechanical reduction of particle size, treatment with the expanding agent or heat-induced expansion of the treated particles may be repeated one or more times to achieve greater expansion or other desired result.

The graphite particles, once mechanically reduced in size, may be of any desired shape or configuration so long as no substantial portion of such particles is smaller in size than about 100 mesh nor larger in size than about one inch. It is likewise desirable that such particles be no greater than about 0.1 inch in the smallest dimension and no less than 0.005 inch in the largest dimension. If particles smaller than about 100 mesh are employed in this invention and the expanded graphite is compressed into compacts, it is found that such expanded product produces structures which are brittle rather than flexible and are mechanically weak. Likewise, particles larger than about one inch in their largest dimension and greater than about 0.1 inch in their smallest dimension, after being expanded according to the process of this invention, and then compacted, form structures which have poor physical strength.

By the term "expanding agents" as used herein is meant organic and inorganic materials which are fluids at ambient temperature, which will penetrate the particles of compressed vermicular graphite and which will volatilize when heated to a temperature of about 100° C. or higher, but which will volatilize rapidly at a temperature of less than about 500° C. The expansion of the compressed vermicular graphite particles of this invention is achieved without the use of intercalation agents for graphite or the strong oxidizing materials as are required for the expansion of natural flake graphite and therefore the problems of handling and corrosion associated with such strong oxidizing materials are eliminated. It is preferred, in the process of this invention, to employ as the expanding agents water, aqueous solutions of water-soluble inorganic acids, inorganic bases, inorganic salts or water-soluble organic compounds containing at least 50 wt. percent water, mixtures thereof, liquid organic materials, and the like. From an economic standpoint, it is most desirable to employ water as the expanding agent since it is both inexpensive and readily available. The addition to such water of up to about 50 wt. percent of a water-soluble organic or inorganic material, however, does not adversely effect the ability of the water or water solution to expand the compressed vermicular graphite. The use of flammable or explosive expanding agents requires cautious heating and handling techniques and therefore such materials are not usually preferred. Examples of suitable expanding agents include water, liquid organic compounds such as acetone, glycerine and hydrocarbon oils, aqueous bases such as conc. ammonium hydroxide (about 30 wt. percent $NH_3$ in water), aqueous solutions of inorganic acids such as concentrated HCl (about 35 wt. percent HCl in water), aqueous solutions of inorganic salts such as a saturated solution of ammonium fluoborate (about 25 wt. percent ammonium fluoborate in water) and the like.

The graphite particles are usually contacted with an expanding agent for up to about 10 minutes or more.

After such contact, the particles may be separated from any excess expanding agent.

After proper sizing and treatment with an expanding agent, the graphite particles may be expanded to a low bulk density, vermicular, malleable form by heating rapidly to a temperature of at least 200° C. and preferably above 500° C. Fast heating is easily accomplished by intimate contact with a flame. Vermicular graphite produced in this manner usually has an apparent bulk density between about 0.005 and about 0.05 gm./cc., occupies from about 10 to about 400 times the volume of the original graphite scrap and has about the same physical appearance as vermicular graphite prepared from natural flake graphite.

Vermicular graphite prepared in accordance with this invention may be compressed by any of the known methods to form sheets, foils, blocks, cylinders or other integral structures of desired configuration. The density of such structures will be determined by the force of compression exerted upon such graphite. Structures formed in this manner from vermicular graphite derived from scrap have physical strength and electrical conductivity characteristics approaching those of structures prepared by compressing vermicular graphite derived directly from natural flake graphite.

The following examples are provided to more fully illustrate the invention but are not to be construed as limiting the scope of such invention.

EXAMPLE 1

30 grams of compressed vermicular graphite lathe turnings having a density of 0.6 gm./cc., a bulk density of 0.25 gm./cc. and a particle size from 4 to 16 mesh were treated with water and expanded rapidly at 750° C. The compressed vermicular graphite underwent about a 10-fold volume increase. The expanded vermicular material was uniaxially compressed in a mold under about 17,000 p.s.i. compression force into a thin slab measuring 1¼" x 4⅝" x .155" and having an apparent bulk density of 1.97 gm./cc.

The specific resistance, measured in the direction perpendicular to that of compression was 217 microhm-inches and the tensile strength measured in the direction perpendicular to that of compression was 595 p.s.i.

Natural flake graphite (#1 grade) wetted thoroughly with water and heated rapidly to 750° C. did not produce expansion of such graphite flakes.

EXAMPLE 2

Lathe turnings having an apparent bulk density of 0.25 gm./cc. were produced from a block of compressed vermicular graphite having a density of 0.6 gm./cc. Such turnings were reduced in size to produce 4 to 16 mesh size particles which were then treated with various expanding agents and then heated rapidly to about 750° C.

Treatment of such graphite lathe turnings with the expansion agents was performed by immersing the particles of lathe turnings in a liquid expanding agent for about one minute at room temperature, then draining off the liquid and placing the treated compressed graphite particles in a 750° C. environment. Each sample was left in the hot environment for about 2–4 minutes, such length of time being sufficient to effect substantially complete expansion.

The following chart illustrates the results of such experiments:

| Expanding agent: | Apparent bulk density after thermal treatment, gm./cc. |
|---|---|
| None (control) | 0.25 |
| $H_2O$ | 0.028 |
| Conc. $NH_4OH$ (about 30 wt. percent $NH_3$ in water) | 0.02 |
| Acetone [1] | 0.0179 |
| Conc. HCl (about 35% HCl in water) | 0.0133 |
| S.A.E. 20 wt. motor oil [1] | 0.0666 |
| Glycerine [1] | 0.02 |
| Saturated aqueous solution of ammonium fluoborate | 0.014 |

[1] As a safety precaution these samples were pre-ignited with a flame immediately before being placed in the 750° C. environment.

With the exception of the control, all of the samples after thermal treatment had been converted to a low density, compressible, vermicular form of graphite.

Treatment of 20 to 80 mesh natural flake graphite in the same manner and with the same expanding agents did not achieve any noticeable expansion of such graphite flakes.

EXAMPLE 3

Particles of compressed vermicular graphite having a density of about 1.9 gm./cc. and being about 0.5 inch long in the longest dimension were saturated with one portion of a solution of 40 gm. of concentrated $H_2SO_4$, 8 gm. of $KClO_3$ in 50 gm. of water. After thoroughly soaking in this solution the compressed vermicular graphite particles were drained, washed with water and heated to redness in a flame. Upon contact with the flame, all of the treated graphite particles rapidly expanded to form the vermicular form of graphite.

In a control experiment natural crystalline flake graphite having a particle size of about 20 to 80 mesh was thoroughly saturated with another portion of same solution employed above. After thorough soaking, the graphite particles were drained, washed with water and heated to redness in a flame. Such process produced no noticeable expansion of the graphite particles.

Various modifications can be made in the present invention without departing from the spirit or scope thereof for it is understood that I limit myself only as defined in the appended claims.

I claim:
1. A process for the recovery of compressed vermicular graphite scrap which comprises:
   (A) mechanically reducing the size of said scrap to particles having a size between 100 mesh and particles about 1 inch in their longest dimension,
   (B) treating such particles by contacting them with an expanding agent which is a fluid at ambient temperature, which will penetrate the graphite particles and which will volatilize when heated to a temperature of less than about 500° C., said expanding agent being selected from the group consisting of liquid organic materials, water, and aqueous solutions of water-soluble inorganic acids, inorganic bases, inorganic salts, and water-soluble organic materials wherein such solutions contain at least 50 weight percent water,
   (C) rapidly heating such treated particles to a temperature of above about 200° C. which is sufficient to volatilize the expanding agent to thereby produce a low density compressible, vermicular form of graphite.

2. The process of claim 1 wherein the expanding agent-treated particles are rapidly heated to a temperature of greater than about 500° C.

3. The process of claim 1 wherein the expanding agent is at least one member selected from the group consisting of water, hydrocarbon oils, acetone, and glycerine.

4. The process of claim 1 wherein the expanding agent is water.

5. The process of claim 1 wherein the size of the compressed vermicular graphite particles to be treated with the expanding agent have a particle size of between about 4 and about 50 mesh.

6. The process of claim 1 wherein the size of the compressed vermicular graphite particles to be treated with the expanding agent have a largest dimension no greater than about 0.1 inch and the smallest dimension is no less than 0.005 inch.

7. The process of claim 1 wherein the treated particles are rapidly heated to a temperature of above about 500° C.

8. The process of claim 1 wherein the low density compressible, vermicular, graphite product is compressed into an integral form.

References Cited

UNITED STATES PATENTS

| 1,137,373 | 4/1915 | Aylsworth | 23—209.1 X |
| 1,191,383 | 7/1916 | Aylsworth | 23—209.1 X |
| 3,389,964 | 6/1968 | Olstonski | 23—209.1 |
| 3,344,212 | 9/1967 | Francis | 264—343 X |

OTHER REFERENCES

Luzi: "Berichte," Jan. 24, 1891, pp. 4085–4095.

Thiele: "Zeitschrift Für Anorganishe Und Allegemeine Chemic" Band 207, 1932, pp. 340–352.

Croft: "Research Science And Its Application in Industry" London, 1957, pp. 23–28.

Ubbelohde: "Graphite And Its Crystal Compounds" London, Claredon Press, 1960, pp. 123–127.

EDWARD J. MEROS, Primary Examiner

U.S. Cl. X.R.

23—209.1, 293; 264—343